Mar. 20, 1923.
G. W. EDMONDSON
1,448,735
MULTIPLE FISHHOOK
Filed May 23, 1922
2 sheets-sheet 1
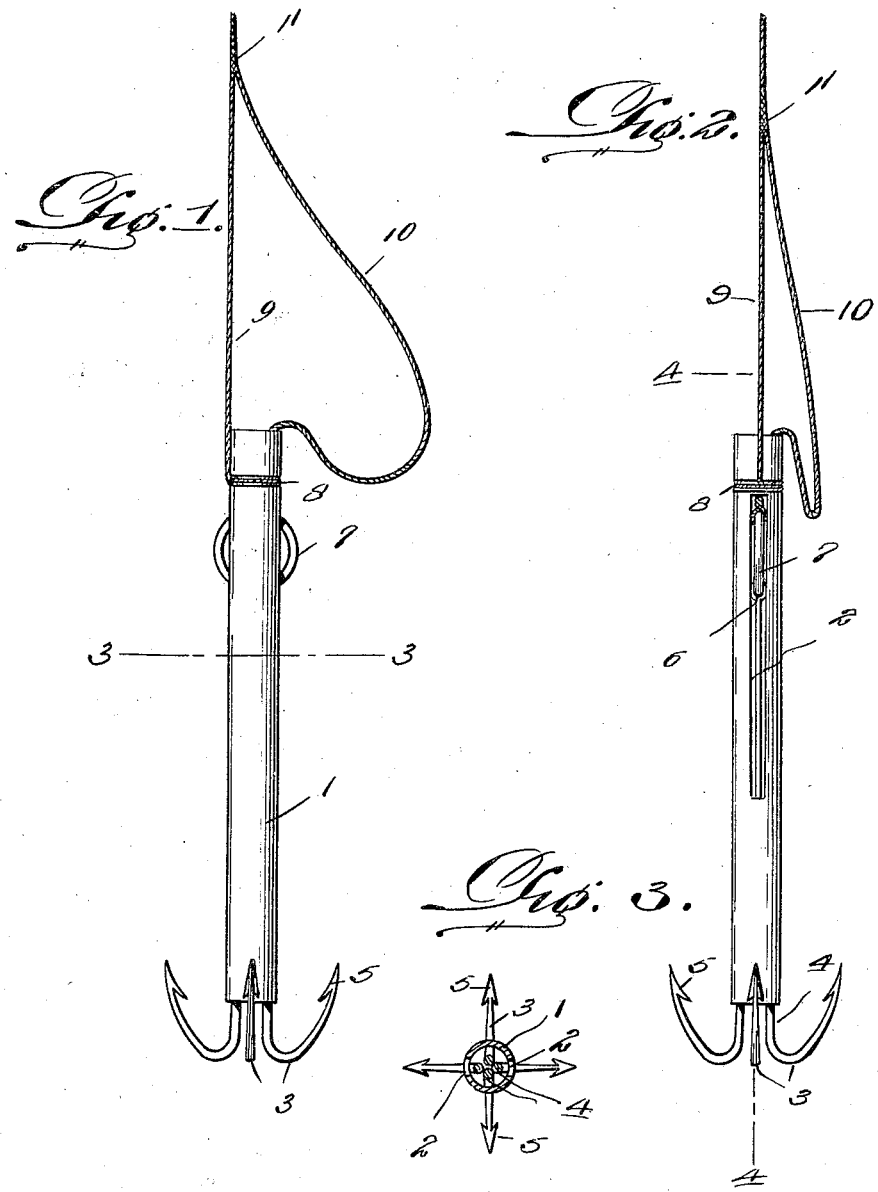
Witnesses:
Inventor
G. W. Edmondson,
By
Attorney

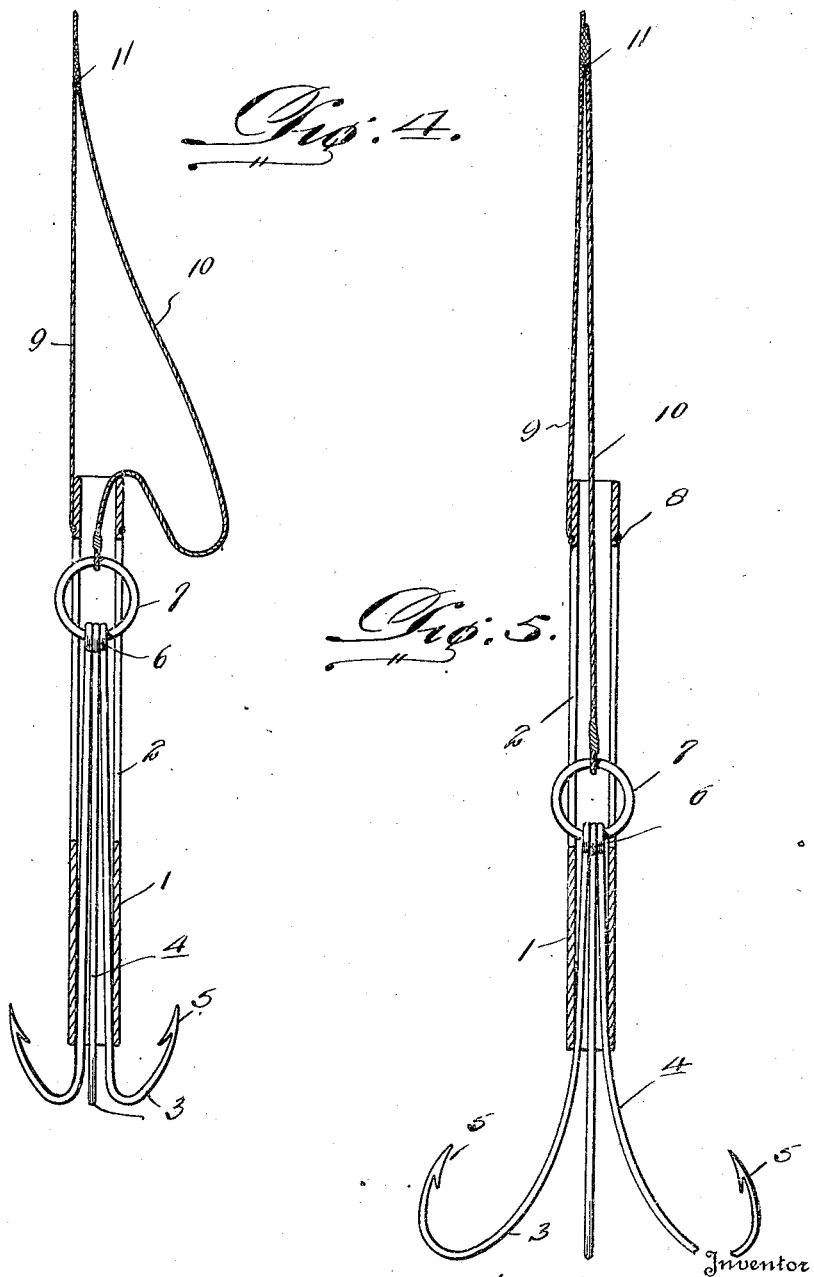

Patented Mar. 20, 1923.

1,448,735

UNITED STATES PATENT OFFICE.

GEORGE W. EDMONDSON, OF NEW YORK, N. Y.

MULTIPLE FISHHOOK.

Application filed May 23, 1922. Serial No. 563,158.

*To all whom it may concern:*

Be it known that I, GEORGE W. EDMONDSON, a citizen of the United States, residing at New York, in the county of New York and State of New York, have invented new and useful Improvements in Multiple Fishhooks, of which the following is a specification.

In carrying out the present invention it is my purpose to provide a multiple fish hook wherein the hooks may be separated in applying the bait thereto and then drawn together and held together when in the water, and wherein the hooks will be moved outwardly away from each other when the fish swallows the bait and hook, thereby causing the hooks to spread in the mouth of the fish, so as to effectively hook the fish and prevent its escape.

It is also my purpose to improve and simplify the general construction of multiple fish hooks and to provide a device which may be manufactured and sold at small cost and which will embody comparatively few parts and these so arranged and correlated as to reduce the possibility of disarrangement to a minimum.

With the above recited objects in view, and others of a like nature, the invention resides in the construction, combination and arrangement of parts set forth in and falling within the scope of the appended claims.

In the accompanying drawings:

Figure 1 is a view in side elevation of a multiple fish hook constructed in accordance with my invention.

Figure 2 is a view taken at right angles to Figure 1.

Figure 3 is a sectional view on the line 3—3 of Figure 1.

Figure 4 is a vertical sectional view through the device showing the hooks in closed position.

Figure 5 is a similar view showing the hooks in open position.

In the practice of my invention I employ a tube 1 of appropriate length and diameter and formed at diametrically opposite points with elongated slots 2 extending longitudinally of the tube. 3 designates a plurality of hooks, four in number in the present instance, each hook embodying a shank 4 and a bill portion 5 adapted to be swallowed by the fish.

The shanks 4 of the hooks are encased in the tube 1 and the upper ends thereof are formed with eyes 6 through which is passed a ring 7. The ring works within the slots 2 and is held in position across the tube by means of the slots.

Formed in the outer surface of the tube adjacent to the upper end thereof is a groove 8 and tied within the groove 8 is one end of a fishing line 9, while connected to the ring 7 is one end of a branch line 10, the other end of which is connected to the main fishing line 9, as at 10.

In practice, the hooks 3 are pulled outwardly from the tube so as to spread the bills or prongs 5, as shown in Figure 5, and the bait is applied to the hooks. The shanks are now drawn into the tube by means of the branch line 10 and ring 7, as shown in Figure 4 of the drawings, and the device is cast into the water. As the fish bite and swallow the hooks the latter are pulled out of the tube by the fish and in the outward movement of the hooks the bills separate, with the effect to lock themselves into the mouth of the fish, thereby effectively holding the fish so that it may be landed.

From the foregoing description, taken in connection with the accompanying drawings, it will be seen that I have provided a fish hook wherein the bait may be quickly and conveniently attached to the hooks and wherein the hooks after entering the mouth of the fish may expand to securely lock the fish to the hooks.

Having thus described the invention, what is claimed as new, is:—

1. A multiple fish hook comprising a tube formed with longitudinal slots at diametrically opposite points, a plurality of hooks each embodying a shank and a bill having the shanks thereof disposed within said tube, and a ring connected to the inner ends of said shanks and slidable within said slots whereby the shanks may be moved into and out of said tube.

2. A multiple fish hook comprising a tube formed with longitudinal slots at diametrically opposite points, a plurality of hooks each embodying a shank and a bill having the shanks thereof disposed within said tube, and a ring connected to the inner ends of said shanks and slidable within said slots whereby the shanks may be moved into and out of said tube, said tube at the end remote from said hooks being formed with an annular groove to receive one end of the fishing rod.

In testimony whereof I affix my signature.

GEORGE W. EDMONDSON.